July 20, 1971
J. R. HAYES
3,594,245
METHOD OF MAKING EMBOSSED PANEL
Filed July 17, 1967
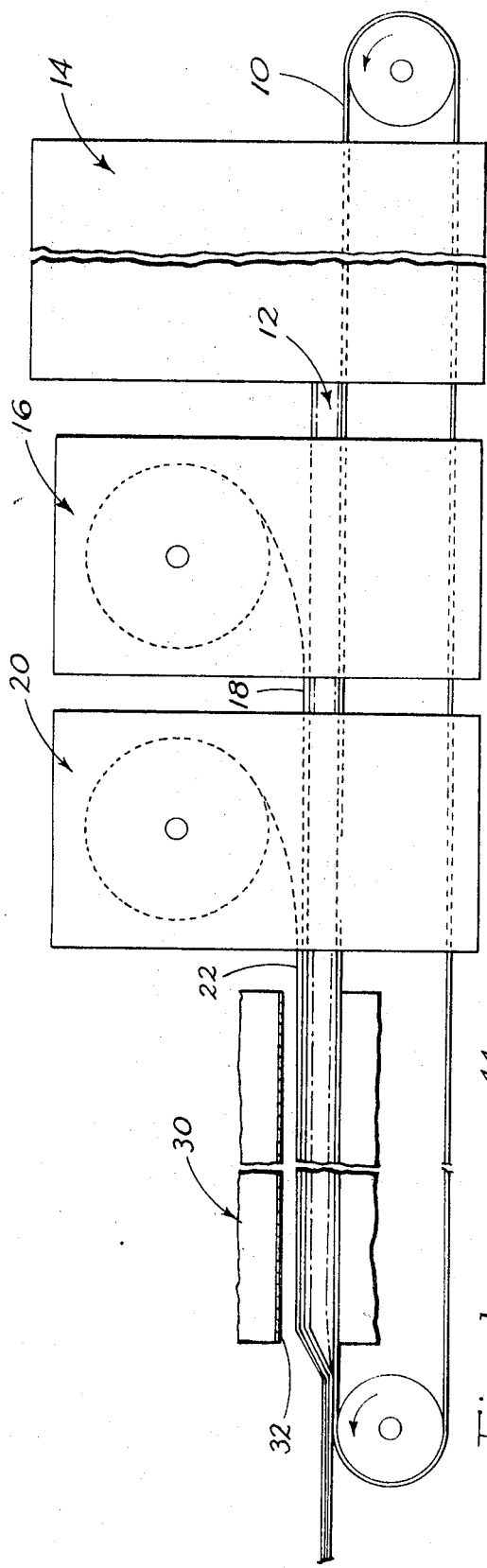
Jack R. Hayes
INVENTOR
BY Kolisch + Hartwell
Attys.

## 3,594,245
METHOD OF MAKING EMBOSSED PANEL

Jack R. Hayes, Crescent City, Calif., assignor to Hambro Forest Products, Inc., Crescent City, Calif.
Filed July 17, 1967, Ser. No. 653,826
Int. Cl. B29j 5/04
U.S. Cl. 156—62.2
2 Claims

ABSTRACT OF THE DISCLOSURE

A panel having a plastic film as an overlay over a dense base layer of particle board, with an embossed pattern borne by the base layer and the overlay, manufactured by the steps of preparing a mat of loosely organized, bondable particle material, placing a plastic film over this mat, and with an embossing plate having a pattern in relief carried over one face, pressing the plastic film against the mat, simultaneously with the application of heat, to consolidate the film and the particle material in the mat into an integral panel product, with the pattern on the face of said plate transferred in tactile form through the overlay to the dense base layer.

---

This invention relates to the manufacture of panels, and more particularly, to the manufacture of a panel from fibrous ligno-cellulose particles, which are consolidated to form a dense base layer in the panel. A surfacing sheet, more specifically a plastic film, is consolidated in the panel as a protective overlay. According to a preferred embodiment of the invention, the plastic film is placed over a mat of loosely organized wood particles, and an embossing plate having a pattern in relief carried over one face is pressed against the film and underlying mat to consolidate the film and the mat into an integral panel, with the plastic overlay and the dense base layer in the final panel both carrying the impression of the pattern borne by the embossing plate.

Generally, therefore, an object of this invention is to provide an improved panel, prepared from fibrous ligno-cellulose particles and a surfacing sheet.

A related object is to provide an improved process for the manufacture of such a panel.

More specifically, an object of the invention is to provide an improved panel, and method for its preparation, characterized in that an embossed pattern is produced on the face of the panel, which pattern is borne both by an overlay film and a dense base layer in the panel, by reason of pressing together a fibrous mat and surfacing sheet in a single operation, using an embossing plate which simultaneously effects densifying of the mat, bonding of a surfacing sheet, and embossing of one side of this mat and the surfacing sheet which lies there against.

According to conventional practice, a plastic overlayed panel is prepared through the steps of seal coating with a solvent-borne adhesive one face of an already prepared plywood, particle board, or other wood panel. The adhesive layer is then softened, and a plastic film as an overlay pressed onto the adhesive. After placing of the overlay, attempts have been made to emboss a design on the face of the panel, but the degree of embossment and the permanence of the embossed design is poor, apparently principally by reason of the fact that the design is borne substantially entirely by the surfacing film, and significant embossment of the already dense particle board base does not occur. The best finished textured surfaces on particle board panels have been produced by applying liquid finishes on a pre-embossed wood surface; however, this process is limited in application, due to the types of finishing materials that may be utilized.

According to the invention, since embossing of the panel is performed on an assembly which immediately prior to the embossment comprises a loosely organized mat covered by a surfacing sheet, upon the embossment being performed, clear definition of the embossed design or pattern is produced in the surfacing sheet with the design carried in tactile, clearly defined form into the face of the wood layer in the panel. The permanence of the embossed pattern is good. Further, certain advantages are noted in connection with the bonding of the overlay to the fibrous base. For one thing, a certain amount of mechanical fixing of the overlay is possible, by reason of the embossed pattern being clearly borne by the fibrous base, which operates mechanically to hold the overlay in place. Further, any binder in the fibrous mat functions also to produce a bond with the surfacing sheet forming the overlay. With the process contemplated, resin as binder in the mat has not already been cured in a compression step, as is the case when the fibrous mat is preconsolidated. With the process, the manufacturer is not limited to liquid finishes, and many different types of surfacing sheets are usable to form the overlay.

Other objects and advantages are attained by the invention, and the same is described in conjunction with the accompanying drawings, wherein:

FIG. 1 illustrates, diagrammatically, a series of mechanical operations such as may be performed in carrying out the invention; and FIG. 2 illustrates part of a panel product as produced by the invention, with portions of the overlay removed.

As already indicated generally above, a distinguishing feature of the present invention is the manufacture of a panel from fibrous, ligno-cellulose particles, wherein the particles are first prepared as a mat of loosely organized material, and a flexible, deformable surfacing sheet is applied to this particle assembly prior to compression of the mat to consolidate it into a dense base layer.

Referring to FIG. 1, the mat of fibrous particles may be prepared on a conveyor belt such as the one illustrated diagrammatically at 10, using conventional practices employed in the particle board industry. It is preferable to form the mat with relatively heavy surface layers of fine fibers separated by a core layer of more coarse fibers. In this way, the best definition of the embossed pattern is obtained on that face of the panel product which has the overlay and the opposite face in the final panel product is surfaced with relatively fine fibers.

This separation of a mass of fibrous particles into layers of fine and more dense particles may be performed using gravity separating principles now employed in the particle board industry. Speaking in general terms, when a mass of particles is blown in an air stream, generally in a path paralleling a conveyer and in a direction opposed to the conveyer's movement, the finer particles will tend to travel further along the conveyer before settling on the conveyer's surface than do the coarser particles which settle relatively rapidly. As a consequence, a layer of relatively fine particles collects on the conveyer's surface at a location remote from the blower and the more coarse particles deposit as a covering layer over these fine particles. Separation of a mass of particles into a lower layer of coarse particles covered by an upper layer of finer particles may be performed by blowing a mass of particles in a stream paralleling the conveyer and in a direction which coincides with the conveyer's movement. This results in the coarse particles settling first, with the finer particles then forming a covering overlay. Using such a particle distribution system, therefore, a mat may be prepared comprising a base layer of fine particles, a core layer of coarser particles, and a covering upper layer of fine particles. In FIG. 1, such a mat comprising layers so prepared is indicated generally at 12. The station where the particles are distributed to form such layers is indicated generally at 14.

The overall thickness of the mat prepared, of course, will vary, depending upon the thickness desired in the final board product. Thus, and by way of example, to prepare a final panel product of approximately ½ inch thickness, and using a press pressure in the neighborhood of 500 p.s.i.g., a mat of approximately 3¼ inch thickness might be prepared. For thicker or thinner boards, the thickness of the mat is appropriately increased or reduced.

A resin binder may be incorporated with the particles prior to their being distributed as a mat on conveyer 10. In a typical operation, an aqueous solution of resin is sprayed onto the particles while moving them in a tumbler, whereby the resin is effectively distributed. Any of the various well-known resins employed in the woods products industry, such as the thermosetting urea formaldehyde or phenol formaldehyde resins are suitable. Conventionally, from about 5% to 10% resin (based on the weight of the chips) is employed, with somewhat more resin usually being utilized with the urea resins than with the phenolic resins. Resins of the type that are usable in the process, and procedures involved in particle board manufacture, are disclosed in U.S. Pats. 2,631,097 and 2,631,098. While a specific procedure of spraying the binder has been disclosed, it is obvious that other procedures are usable, such as sprinkling dry resin on the chip mass, etc. With spraying of the aqueous resin solution, the moisture content of the chips might be expected to be raised from an initial moisture content of about 4%, to a final moisture content of about 8%.

The usual particle board panel is consolidated using heat as well as pressure, with temperatures employed which range between about 225° and 400° F. With much higher temperatures, degradation of the wood may be a problem. According to this invention, plastic film as overlays are employed including what are referred to herein as thermo-stabile films (films having melting points above the temperatures used during pressing) and thermo-plastic films (having melting points below the temperatures used in pressing).

According to this invention, and where a plastic film such as a thermo-stabile polyvinyl fluoride film is employed (with melting points well in excess of 500° F.), an adhesive or glue line is applied to the loosely organized mat of particles as the next step in the manufacture. To minimize disorganization of the particles, and for other reasons of convenience in manufacture, it has been found expedient to prepare this glue line by laying a resin-impregnated paper sheet or web over the mat of particles as it advances from sation 14. The resin impregnating such web again may be of the phenolic or urea type, an the manufacture of such a web is discussed in the above-identified U.S. patents. In FIG. 1, the station where such a glue line, in the form of a resin-impregnated sheet, is prepared over the mat of particles, is indicated at 16. The resin-impregnated sheet is shown at 18.

Following the application of the glue line, where such is used, and as a next step in the manufacturing procedure, a surfacing sheet which is to form the overlay is placed over the assembly, with the fibrous particles in the mat still loosely organized. Specifically contemplated are plastic films, which are flexible and deformable, and readily laid down from a roll onto the top of the mat assembly. The films used ordinarily are opaque, where it is desired to conceal the particle board consistency of the base in the final panel, and may, if desired, be provided with a color pattern. In FIG. 1, the station where the plastic film or surfacing sheet is applied is shown at 20, and the film itself at 22.

A number of different plastics may be employed as the material in such films, including as already discussed, the thermo-stabile and the thermo-plastic materials. With the former, it is desirable to include a glue line in the panel between the film overlay and the particulate mat. The thermosetting resins employed in the glue line form part of the surface overlay in the final product, whereby ultimately there is formed a tough, long-lasting overlay film which is securely bonded in place. Examples of thermo-stabile resin films that might be employed are the polyvinyl fluoride film previously mentioned, and saturated polyester films with the required high melting points (for instance Mylar, marketed by E. I. Dupont, having a melting point well in excess of 500° F.). As will hereinafter be described, in the manufacture of certain panels, and when a thermo-plastic film is used, such as a rigid polyvinyl chloride film having a melting point slightly below press temperature, a satisfactory bond is obtained between the film and mat of fibrous particles without the inclusion of a glue line. Panel products produced with such thermo-plastic films also have the advantage of possessing a final overlay which is somewhat less brittle, and exhibit less tendencies to warp. As another alternative, panels may be produced without the use of a separate thermosetting resin glue line, by applying as an overlay film a thermo-stabile polyvinyl chloride film which before application is back coated with a pigmented thermo-plastic acetate film with a melting point of 250° F. where a press temperature of 300° F. is employed.

In general terms and when an embossed pattern is produced on the panels, a film thickness ranging between about 0.0001 to 0.004 inch is preferred, with films of greater thinness tending to rupture with handling, and films of greater thickness representing an unjustified expense.

The entire assembly prepared in stations 14, 16 and 20 is then moved by conveyor 10 between the platens of a press, for consolidation of the assembly into an integral product. To produce an embossed pattern on the face of the panel product, a caul plate is placed over the top of the assembly, with the bottom face (or the face which lies against the assembly) having an embossed pattern carried in relief thereon. Exemplary of the types of pattern that might be applied are a basket weave type of pattern, or one containing elongated ridges separated by shallow valleys. In the usual instance, the difference in elevation between high and low points in the embossed pattern ranges from about 0.005 inch to 0.25 inch. The pressing station, where consolidation of the assembly takes place, is indicated in the drawings at 30, with the caul plate containing the recessed embossed pattern illustrated at 32.

In the apparatus illustrated in FIG. 1, conveyor 10 is shown as the transporting agency for the assembly through press station 30. Typically, and with present day adhesives, a press cycle of usually less than six minutes is sufficient to produce consolidation of the assembly into an integral unit. During this press interval, the conveyer belt is stopped, with movement taken up again on the release of the press. The machinery in mat preparation station 14 is constructed so as to produce desired relative movement between the particle distributors and the conveyor belt during this period that the belt is stationary.

When using the conventional phenolic and urea resin binders or adhesives, press pressures ranging preferably from about 250 to 550 p.s.i.g. are employed, and the press itself is heated, preferably to temperatures ranging from about 225° to 400° F. A press cycle of from about two to six minutes may be utilized, including an initial interval of first press stage of relatively low pressure (of from 15 to 60 seconds duration), followed by a longer interval or second press stage of full pressure. During this initial interval of light pressure (in the neighborhood of 40 to 100 p.s.i.g.), a preheating of the plastic film occurs, and a heating of the resin binder and any resin in the glue line is produced, with such resin then flowing to the region between the overlay and the particulate mat to produce a good bond. During the subsequent longer press interval, which with a 3-minute press cycle may be in the order of two minutes or so, final compaction of the particles and firm bonding of the film to the densified or compacted particle mass occurs, with setting of the resin.

Describing the production of a panel as contemplated by this invention, a board furnish was prepared from Douglas fir chips, having the following screen analysis: +4 mesh, 1.0%; +10 mesh, 26.0%; +20 mesh, 21.0%; +48 mesh, 11.0%; —48 mesh, 7.0%.

Such furnish, after having distributed therein approximately 6% by weight urea formaldehyde resin, was prepared into a mat, of approximately 3¼-inch total thickness, having a layer of relatively coarser chips sandwiched between layers of finer chips (48 mesh or less). A paper web impregnated with phenol formaldehyde resin was placed over the top of this mat, to form a glue line, and over this glue line there was placed an opaque polyvinyl fluoride plastic sheet or film of approximately 0.002-inch thickness, which film was stabile at temperatures exceeding 500° F. The assembly comprising the mat, the glue line, and the plastic film was subjected to a two-minute fifty-second press cycle comprising 50 seconds of press pressure at about 60 p.s.i.g., and two minutes of press pressure at 500 p.s.i.g. Press temperature was 380° F. Completed panels were formed of approximately ½-inch thickness. The embossed pattern carried in relief on the caul plate used resembled a basket weave (see FIG. 2), and had a difference in elevation between high and low points of 0.10 inch. After leaving the press, panels were cut from the consolidated assembly.

The completed panels formed had a well-defined embossed pattern over their faces, and the permanence of the pattern was good. As illustrated in FIG. 2, where part of such a panel is illustrated, with portions of overlay 40 and glue line 42 removed, the embossed design was carried in tactile form well into the surface of the dense base layer 44 formed of the mat of fibrous particles. According to the process, the particles in the mat become bonded together with the binder which is incorporated with the particles while distributed to portray the embossed pattern which is carried into the dense base layer. The pattern produced in the panel had a difference in elevation between high and low points which was substantially the same as the difference in elevation between such points in the pattern on the caul plate, which difference, of course, substantially exceeds the thickness of the plastic film used.

Another panel was prepared using a similar furnish deposited as a mat, but in this instance a pigmented (opaque) polyvinyl chloride film of 0.002-inch thickness having a melting point of 300° F. was applied directly over the mat of chips without the placement of an intermediate thermosetting resin glue line. The film and mat were consolidated into an integral panel product of approximately ½-inch thickness, using the same press pressure as described above, a press temperature of 320° F. and a press cycle comprising a first stage of 50 seconds and a second stage of two minutes 25 seconds. In the final product a bond was produced between the thermo-plastic film used as the overlay and the dense base layer formed of the mat with the resin binder in the chips combining with the thermo-plastic film directly to produce such bond. The bond apparently comes about from a mechanical adhesion resulting from some of the plastic film at the interface between the mat and overlay liquefying and subsequently impregnating surface fibers in the mat, and it is felt that there is also some chemical adhesion produced with the resin distributed in the fibers.

In another panel manufacture, a polyvinyl chloride film back coated with a pigmented polyvinyl acetate coating was utilized as the overlay. More specifically, a mat of wood chips was prepared as previously described. The polyvinyl chloride film had a 0.0025-inch total thickness, and consisted of a 0.002-inch thick, clear polyvinyl chloride layer (with a melting point of about 450° F.) back coated with a 0.0005–inch layer of pigmented polyvinyl acetate (with a melting point of 220° F.). This back coated polyvinyl chloride film was applied directly over the mat of chips, without placement of any intermediate thermosetting, resin glue line. In consolidating the assembly into an integral panel product, a press pressure of 500 p.s.i.g. and a press temperature of 340° F. was employed. A press cycle comprising a first stage of 50 seconds and a second stage of two minutes 25 seconds was utilized. A final produce was obtained with good coverage provided by the overlay. The back coating of polyvinyl acetate was pigmented and opaque, and the coloration of the back coating was apparent on the face of the panel. There was also good definition of the embossed pattern observed in the surface of the panel.

The manufacture of a panel utilizing as an overlay a plastic film comprising a thermo-stabile outer layer back coated with a thermo-plastic layer has some advantages over the manufacture of a panel utilizing an overlay film which is thermoplastic in its entirety. Thus, and when a panel is produced with a film which is composed entirely of a thermo-plastic material or one which has a melting point below the press temperature employed, it is desirable to select a plastic with a melting point not more than about 40° below the press temperature utilized, since with a lower melting point material the plastic tends to migrate into the wood fibers of the mat, significantly reducing the coverage afforded by the film and the hiding power of the film. With an overlay prepared from a film comprising an outer layer of thermo-stabile plastic back coated with a thermo-plastic material, greater liberality is permitted in the selection of the press temperature, with a plastic in the back coating having a melting point as much as 100° below the press temperature producing a good bond and with the relatively stabile plastic in the outer layer producing in the panel product the coverage and hiding power desired. The panels, moreover, possess the resistance to warping which generally characterizes panels prepared from films without inclusion of the thermosetting resin glue line.

Summarizing some of the advantages of the invention over processes used today in the production of panels, as already indicated, a superior textured surface on the panel is produced in embossed design being permanently molded into the base layer provided by the chips. In the case of panels prepared with a separate glue line, this design is stabilized by the glue line. Where thermoplastic films are employed, it is possible with the process contemplated to bond the films in place directly, and without the inclusion of a separate glue line. The overlays so produced have the advantage of being somewhat less brittle than overlays produced with a separately prepared intermediate glue line. Because the design is molded directly into the dense base layer, a certain amount of mechanical fixing of the overlay results. The thermosetting resins have a degree of heat stability which is desirable. In general terms, a well-surfaced panel is produced using much thinner overlay films than with prior known techniques, which makes a possible substantial savings in cost. In the case of panels surfaced with thermoplastic films, savings in adhesive costs are possible by reason of the elimination of a separately prepared glue line between the overlay and the dense base layer in the final product.

While several modifications of the invention have been described, obviously changes and variations are possible without departing from the invention. It is desired to cover all such modifications and variations as would be apparent to one skilled in the art, and that come within the scope of the appended claims.

It is claimed an desired to secure by Letters Patent:

1. A method of manufacturing a panel product comprising
   preparing a mat of loosely-organized, bondable, fibrous, ligno-cellulose particles, placing directly over such mat a flexible thermoplastic surfacing sheet, pressing the mat and surfacing sheet in a press and with pressure applying heat at a temperature above the melting point of the thermo-plastic surfacing sheet, using during such pressing an imperforate embossing plate having a pattern in relief carried on its face which is placed against the surfacing sheet, said pattern in relief being recessed no more than about 0.25 inch and by reason of such slight depth of recess and of being imperforate performing containment of the plastic in a sheet against the mat during the application of heat and pressure, and by the application of such heat and pressure causing said surfacing sheet to be formed to duplicate the entire profile of the pattern in relief carried on the face of the embossing plate and further causing the particles to become bonded together while also portraying such pattern.

2. The method of claim 1, wherein pressing is done using an interval of light pressure followed by an interval of considerably greater pressure.

References Cited

UNITED STATES PATENTS

| 3,461,016 | 8/1969 | Irving, Jr. et al. | 156—62.2X |

FOREIGN PATENTS

| 965,108 | 7/1964 | Great Britain | 156—62.2 |
| 1,026,394 | 4/1966 | Great Britain | 156—62.2 |
| 1,358,037 | 3/1964 | France | 156—62.2 |

LELAND A. SEBASTIAN, Primary Examiner

U.S. Cl. X.R.

156—209; 161—413